United States Patent [19]

Lapeyre

[11] 4,171,045
[45] * Oct. 16, 1979

[54] RAISED LINK MODULAR CONVEYOR BELT

[75] Inventor: James M. Lapeyre, New Orleans, La.

[73] Assignee: The Laitram Corporation, New Orleans, La.

[*] Notice: The portion of the term of this patent subsequent to Oct. 4, 1994, has been disclaimed.

[21] Appl. No.: 870,995

[22] Filed: Jan. 20, 1978

[51] Int. Cl.² .............................................. B65G 17/06
[52] U.S. Cl. ................................. 198/853; 198/688; 198/796
[58] Field of Search ............... 198/853, 851, 850, 793, 198/796, 688; 74/245 C, 245 P, 245 LP, 250 C, 245 R

[56] References Cited

U.S. PATENT DOCUMENTS 4,051,949  10/1977  Lapeyre .............................. 198/853

FOREIGN PATENT DOCUMENTS 944712  4/1974  Canada ..................................... 198/688

Primary Examiner—Robert B. Reeves
Assistant Examiner—Douglas D. Watts
Attorney, Agent, or Firm—Weingarten, Maxham & Schurgin

[57] ABSTRACT

A conveyor belt comprising a plurality of like modules each module including a plurality of links having an upper conveying surface and providing axial passageways into which the teeth of a conveyor comb extend. A plurality of dogs are integrally formed with the links of each module upwardly extending above the conveying surface and disposed along a transverse axis of the modules.

15 Claims, 5 Drawing Figures

U.S. Patent  Oct. 16, 1979  Sheet 1 of 2  4,171,045
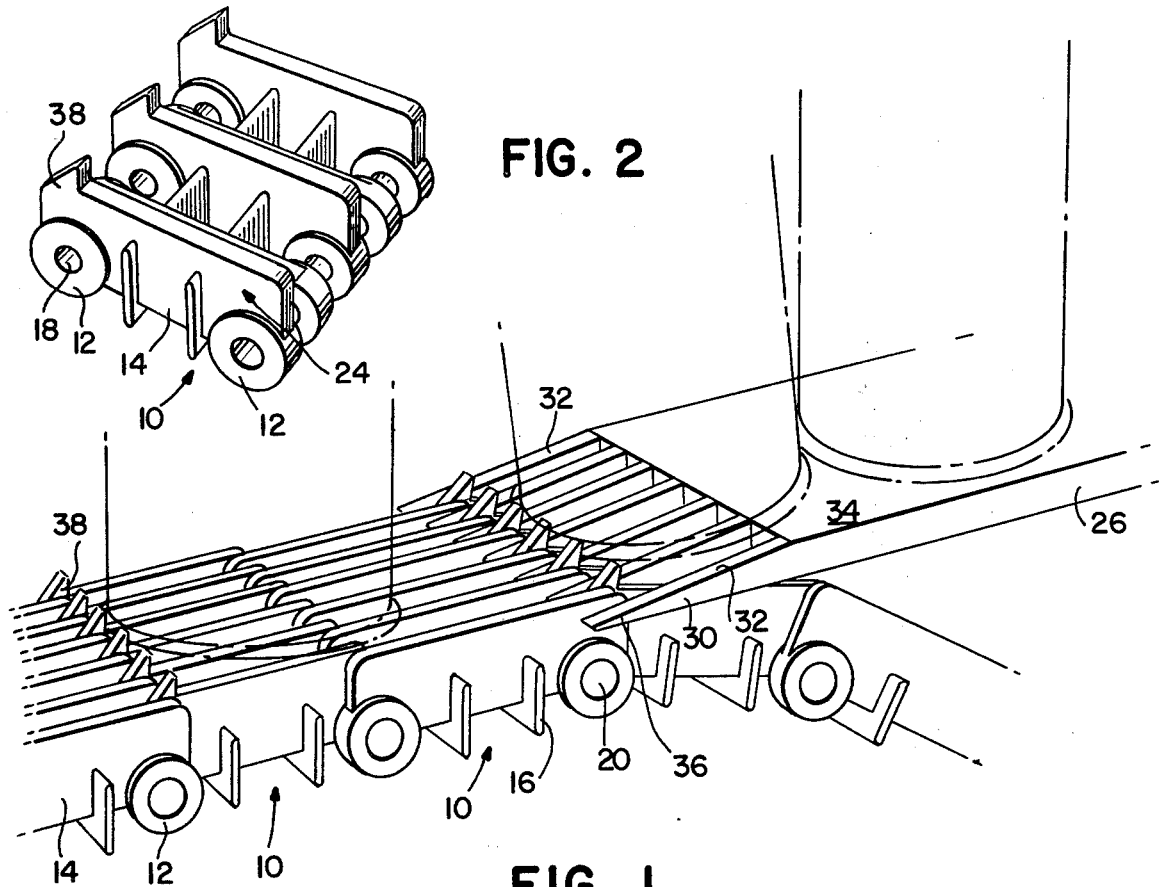
FIG. 2
FIG. 1
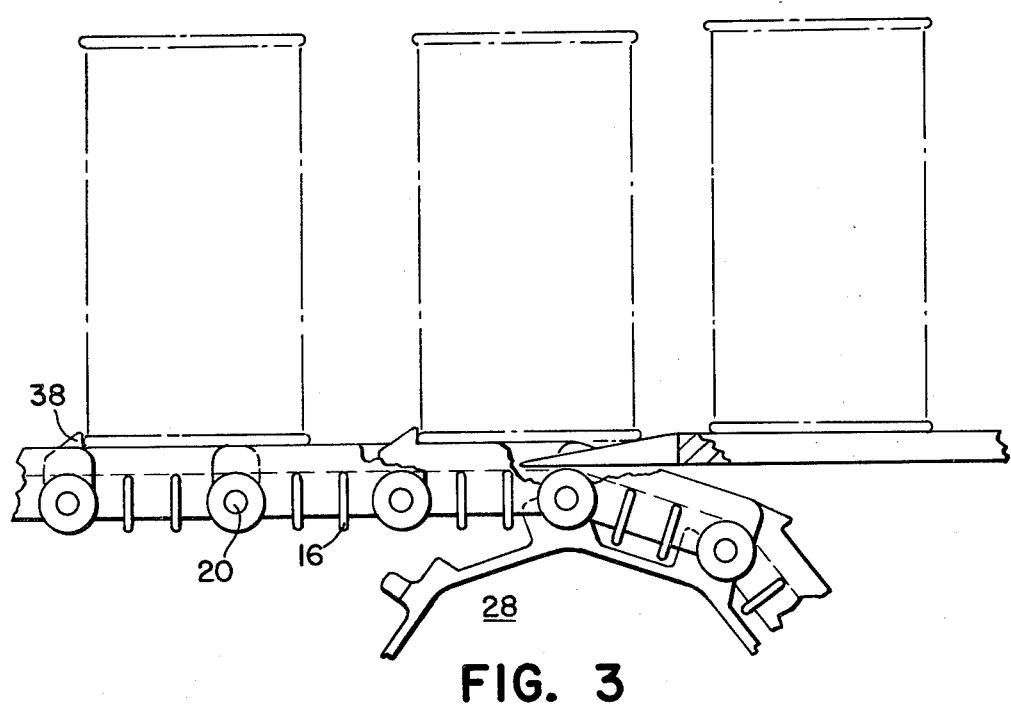
FIG. 3

RAISED LINK MODULAR CONVEYOR BELT

FIELD OF THE INVENTION

This invention relates to conveyors and more particularly to a modular conveyor belt and cooperative comb for transferring articles to and from the belt.

BACKGROUND OF THE INVENTION

A modular conveyor belt is the subject of U.S. Pat. No. 3,870,141 and which comprises modules pivotally connected to one another, each module being molded as a single unit preferably of a plastic material. Each module includes a number of parallel spaced links having end sections with aligned holes for accomodation of pivot rods, and intermediate sections joined by integral cross members to form a rigid supporting grid. The modules are end to end mateable; that is, a module is capable of being connected to or mate with a like module at its ends irrespective of which end of which module is employed. The conveyor module thus formed is simple and inexpensive to manufacture and assemble into a conveyor belt or the like of any width and length.

In U.S. Pat. No. 4,051,949 there is shown a variant of the above-described conveyor belt and which is operative to transport articles onto and off of a conveyor comb. This conveyor comprises modules similar to those shown in U.S. Pat. No. 3,870,141 and includes on each module, a plurality of links which are upwardly extending to provide an upper surface above the surface of the cross members to provide axial passageways into which the teeth of the conveyor comb can extend while the belt is in motion.

SUMMARY OF THE INVENTION

In accordance with the present invention, a conveyor belt is provided which comprises a plurality of like modules similar to those of the aforesaid U.S. Pat. No. 4,051,949 and including a plurality of dogs integral therewith and operative to engage the product or article carried on the conveyor belt and to push such product onto the conveyor comb for removal from the belt. Each module includes an array of link ends at each end of the module, the link ends of each module being pivotally connected to the link ends of an adjacent module by a pivot pin passing through aligned openings in the link ends of the modules. A number of links of each module are raised and extend as vertical flights above the surface of the cross members of the modules to provide a sufficient axial passageway into which the teeth of a conveyor comb can extend while the belt is in motion. A plurality of dogs are integrally formed with some or all of the raised links of each module and upwardly extend above the conveying surface. These dogs are arranged usually along a transverse axis orthogonal to the conveying axis to engage an article disposed on the conveying surface and to push the article onto the conveyor comb for removal of the article from the conveyor belt. Alternatively, two arrays of dogs can be provided on each module to retain an article on the conveying surface between the two arrays thereby to maintain the article in fixed position during movement of the conveyor belt, which movement can be either continuous or indexing. The take-off surface of the conveyor comb can be substantially coplanar with the conveying surface of the belt or can be above the conveying surface in which case the height of the dogs above the conveying surface is sufficient to move the article up onto the take-off surface during belt movement.

DESCRIPTION OF THE DRAWINGS

The invention will be more fully understood from the following detailed description taken in conjunction with the accompanying drawings, in which:

FIG. 1 is a perspective view of a modular conveyor belt embodying the invention;

FIG. 2 is a perspective view of a module embodying the invention;

FIG. 3 is an elevation view, partly in section, of a modular conveyor belt embodying the invention;

DETAILED DESCRIPTION OF THE INVENTION

Figure 4:
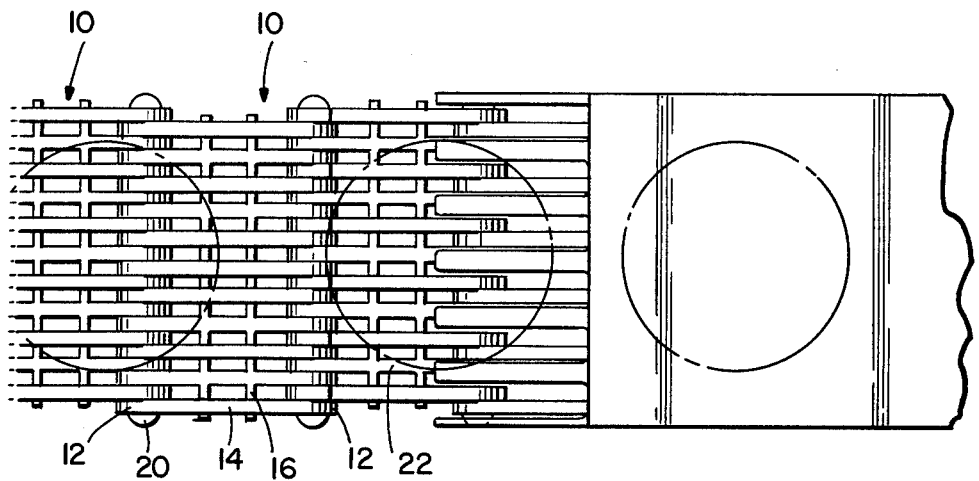
FIG. 4 is a plan view of a modular conveyor belt embodying the invention.

With reference to the drawing, the modular conveyor belt constructed according to the invention comprises modules 10 which are each formed as an integral unit of a plastic material by well known injection molding or other molding processes. Each module 10 includes a multiplicity of elongated, parallel, spaced link like elements, the length of the module being equal to the length of each link and the width of the module being determined by the number of links.

All of the link like elements are substantially identical and each include end sections 12 joined by an intermediate connecting section 14 having a generally rectangular cross section with a greater depth than width. The link like elements are joined as a unit by at least one and preferably a pair of spaced cross members 16 formed integrally with connecting sections 14 to form a rigid open structure. End sections 12 when viewed in side elevation, include at least a partially circular cross section and are formed to circumscribe corresponding ones of aligned holes 18 for receiving pivot pins or rods 20 adapted to pivotally connect the modules end to end while laterally aligning adjacent modules. The ends of cross members 16 extend beyond the end ones of connecting sections 14 so that cross members of laterally adjacent modules will abut one another when assembled as a conveyor belt. The cross members 16 maintain the link like elements in parallel relation so that the faces of end sections 12 remain parallel and pivot holes 18 remain aligned, to minimize bending stresses across rods 20. The rods 20 are preferably preformed with a head on one end, the other end of the rod being headed such as by heating after insertion of the rod through the aligned holes 18 of interconnected modules 10.

The end sections 12 have planar parallel confronting surfaces each spaced from adjacent confronting surfaces by an amount slightly greater than the width of the end sections 12 such that the module can be pivotally mated with other like modules, with the link ends of the interconnected modules being in rotatable contact with each other.

Each module 10 includes a first plurality of link like elements 22 each having an upper surface at or slightly above the upper surface of cross members 16. A second plurality of link like elements 24, alternately disposed with the first plurality of elements 22, extends upwardly as a vane or flight to an upper surface above the surface of the elements 22 and proves a substantially flat conveying surface which is substantially parallel with the axis along the length of the module and bisecting the pivotal holes 18. The raised links 24 define longitudinal channels adapted to receive the teeth of a conveyor comb for transfer of products to and from the conveyor belt. As seen particularly in FIGS. 1, 3 and 4, the conveyor comb 26 is disposed as a continuation of the conveying surface at a position at which the conveyor moves in a curved path around an associated sprocket wheel 28. The conveyor comb 26 includes a plurality of teeth 30 disposed within respective channels between the raised links 24 and which may include end teeth which are outboard of the end links 24, the teeth having inclined upper surfaces 32 which taper downwardly from the comb surface 34 to the teeth ends 36 which lie below the conveying surface of links 24. Typically the comb 26 is mounted for rotation about a pivot pin at the end opposite to teeth 30 and spring loaded to urge the teeth 30 into engagement with the upper surfaces of links 22.

Each raised link of each module includes an integrally formed dog 38 which upwardly extends above the conveying surface of the raised links 24. The dogs 38 are arranged along a transverse axis orthogonal to the conveying axis and operative to engage an article disposed on the conveying surface and to push the article on to the conveyor comb 26 for removal of the article from the conveyor belt. In the illustrated embodiment the dogs 38 are disposed at the trailing edges of the raised links 24 but the dogs can be arranged at any position along the length of the raised links in accordance with the size of particular articles being transported by the conveyor belt. The dogs can also be of any number across the width of the module; preferably however, the dogs are provided on each raised link 24 across the full width of the module to accomodate an article disposed anywhere across the width of the module. The surface 34 of the conveyor comb 26 can be above the conveying surface of the raised links 24, the articles being transported by the conveyor belt being pushed onto the takeoff surface 34 by action of the dogs 38.

Figure 5:
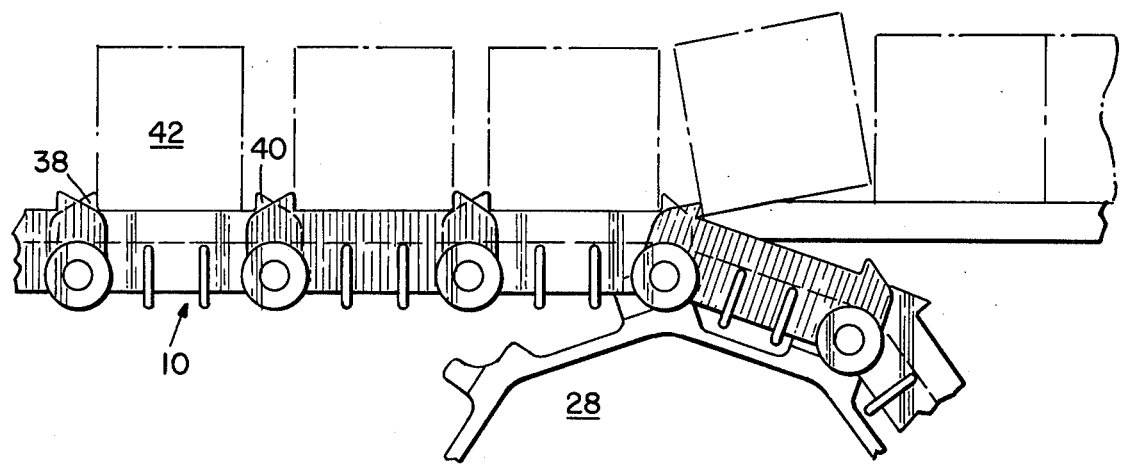
FIG. 5 is an elevation view of an alternative embodiment of the modular conveyor belt.

In alternative embodiment as shown in FIG. 5, two arrays of dogs can be provided on each module to retain an article on the conveying surface between the two arrays thereby to maintain the article in a fixed position during movement of the conveyor belt. As seen in FIG. 5 an array of dogs 38 is provided at the trailing end of each module 10 while a second array of dogs 40 is provided at the leading edge of each module to retain the article 42 therebetween.

The invention can be embodied in a modular conveyor belt of various different constructions and can be employed for example with any of the modular belt versions shown in the aforesaid U.S. Pat. Nos. 3,870,141 and 4,051,949. Accordingly, the invention is not to be limited by what has been particularly shown and described except as indicated in the appended claims.

What is claimed is:

1. A linked belt adapted to move through a circular arc for use in conjunction with a conveyor comb having a plurality of spaced-apart parallel teeth, said belt comprising:
 a plurality of like modules, each of said modules including first and second pluralities of link ends, each end being formed to circumscribe a pivotal hole;
 means for joining said pluralities to one another so that the axes of said holes of said first plurality are arranged coaxially, the axes of said holes of said second plurality are arranged coaxially and the axes of respective holes of both pluralities of link ends are substantially parallel;
 a plurality of spaced apart elongated upstanding vanes mounted on said modules so as to extend in a substantially parallel direction to one another in a direction transverse to the axes of said holes of said both pluralities and protrude substantially perpendicularly from said module;
 the upper surface of said vanes defining a conveying surface of said belt;
 said link ends of each of said modules being releasably engaged between the link ends of an adjacent module except for individual link ends disposed at the extreme sides of said belt;
 means for pivotally connecting said modules at engaged link ends;
 said elongated vanes of each of said modules being arranged in staggered relation with respect to the vanes of adjacent modules, said vanes of each module being spaced from one another sufficiently to form a multiplicity of channels lying beneath the uppermost surface of said belt, said channels being adapted to receive said teeth; and
 a plurality of dogs mounted on each of said modules, each dog upstanding from the upper surface of a respective one of said vanes and disposed along a transverse axis to said vanes, and operative to push an article carried on the conveying surface of the belt onto the conveyor comb as the belt moves downward in a circular arc.

2. A belt in accordance with claim 1 wherein said vanes are each integrally formed with and join a pair of corresponding link ends of said first and second pluralities.

3. A belt in accordance with claim 1 further including at least one cross member formed integrally with said vanes for joining said vanes.

4. A belt in accordance with claim 1 wherein said plurality of dogs are arranged in two arrays on each of said modules, each array of dogs being disposed along a respective transverse axis to said vanes, the array being spaced apart along the length of said vanes.

5. A belt in accordance with claim 1 wherein each one of said dogs is integrally formed with a respective one of said vanes.

6. A belt in accordance with claim 5 wherein said plurality of dogs is disposed at the trailing edge of said vanes.

7. A belt in accordance with claim 1 wherein said conveyor comb is substantially coplanar with the conveying surface of said belt, and said dogs extend above the conveying surface by an amount sufficient to engage articles carried on the conveying surface.

8. A linked belt adapted to move through a circular arc for use in conjunction with a conveyor comb having a plurality of spaced-apart parallel teeth, said belt comprising a plurality of like modules, each of said modules including:
 first and second like pluralities of link ends of substantially identical width, each such end being formed to circumscribe a pivotal hole through said width, said holes of said first plurality being arranged coaxially;

said holes of said second plurality being arranged coaxially, the axes of respective holes of both pluralities of link ends being substantially parallel;

a plurality of spaced apart elongated elements each integrally formed with and joining a pair of corresponding link ends of said first and second pluralities, said elements being joined by at least one cross member also formed integrally therewith;

said link ends being dimensioned and spaced apart by a distance slightly greater than said width;

said link ends of each said modules being releasably engaged between and substantially in contact with link ends of an adjacent module except for individual link ends disposed at the extreme sides of said belt;

means for pivotally connecting said modules at engaged link ends;

said plurality of elongated elements comprising first and second groups, the elongated elements of said first group having upper surfaces disposed at a like height not below the upper surface of said cross member, and said elongated elements of said second group having upper surfaces disposed at a second like height above said first height, said elongated elements being arranged so as to form a multiplicity of channels lying beneath the uppermost surface of said belt, said channels being adapted to receive said teeth; and a plurality of dogs, each integrally formed with a respective one of said elongated elements of said second group and upstanding from the upper surface thereof, each dog disposed at a predetermined position along the length of the respective elongated element and along a transverse axis to said elongated elements of said second group.

9. A belt in accordance with claim 8 wherein the upper surface of each elongated element of said second group is substantially flat.

10. A belt in accordance with claim 8 wherein each of said elongated elements of said second group has one of said dogs integrally formed therewith.

11. A belt in accordance with claim 8 wherein each of said elongated elements of said second group has first and second dogs integrally formed therewith and spaced from each other along the length of said elements of said group.

12. In a module for constructing a conveyor belt to be driven around a circular arc for use in conjunction with a conveyor comb having a plurality of spaced-apart parallel teeth, which module includes first and second like pluralities of link ends of substantially identical width, each being formed to circumbscribe a pivotal hole through said width, said holes of said second pluarality being arranged coaxially, the axes of respective holes of both pluralities of link ends being substantially parallel; and a plurality of spaced apart elongated elements each integrally formed with and joining a pair of corresponding link ends of said first and second pluralities, said elements being joined by at least one cross member also formed integrally therewith; said link ends being dimensioned and spaced apart by a distance slightly greater than said width;

the improvement wherein said plurality of elongated elements comprises first and second groups, said elongated elements of said first group having upper surfaces disposed at a first like height not below the upper surface of said cross member, said elements of said second group having upper surfaces disposed at a second like height above the height of said upper surfaces of the elongated elements of said first group;

said first and second groups being arranged to form a multiplicity of channels adapted to receive said teeth; and a plurality of dogs, each integrally formed with a respective one of said elongated elements of said second group and upstanding from the upper surface thereof, each dog disposed at a predetermined position along the length of the respective elongated element and along a transverse axis to said elongated elements of said second group.

13. A module in accordance with claim 12 wherein the elongated elements of said first and second groups are arranged alternately.

14. A module in accordance with claim 12 wherein said first and second groups have substantially like numbers of elongated elements.

15. A module in accordance with claim 12 wherein an intermediate portion of the upper surface of each element of said second group is substantially flat.

* * * * *